(12) United States Patent
Kruzhanov et al.

(10) Patent No.: US 9,718,120 B2
(45) Date of Patent: Aug. 1, 2017

(54) METHOD FOR PRODUCING A COMPOSITE COMPONENT, AND COMPOSITE COMPONENT

(71) Applicant: GKN SINTER METALS ENGINEERING GMBH, Radevormwald (DE)

(72) Inventors: Vladislav Kruzhanov, Remscheid (DE); Volker Arnhold, Wuppertal (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 62 days.

(21) Appl. No.: 14/424,085

(22) PCT Filed: Jul. 31, 2013

(86) PCT No.: PCT/EP2013/002263
§ 371 (c)(1),
(2) Date: Feb. 26, 2015

(87) PCT Pub. No.: WO2014/032756
PCT Pub. Date: Mar. 6, 2014

(65) Prior Publication Data
US 2015/0209858 A1   Jul. 30, 2015

(30) Foreign Application Priority Data

Aug. 29, 2012 (DE) .................. 10 2012 017 040

(51) Int. Cl.
*B21K 25/00* (2006.01)
*B21D 53/84* (2006.01)
(Continued)

(52) U.S. Cl.
CPC ............ *B21K 25/00* (2013.01); *B21D 53/845* (2013.01); *B22F 3/10* (2013.01); *B22F 3/164* (2013.01);
(Continued)

(58) Field of Classification Search
CPC ... B21K 25/00; B22F 7/08; B22F 3/10; C22C 9/04; C22C 21/00; B23P 2700/02
See application file for complete search history.

(56) References Cited

U.S. PATENT DOCUMENTS 3,962,772 A   6/1976  Haller
4,059,214 A  11/1977  Weissmann
(Continued)

FOREIGN PATENT DOCUMENTS

EP      2 000 230 A1   12/2008
WO    2011035858 A1    3/2011

OTHER PUBLICATIONS

PCT International Search Report and Written Opinion, PCT/EP2013/002263, Nov. 25, 2013.

*Primary Examiner* — Moshe Wilensky
(74) *Attorney, Agent, or Firm* — Quarles & Brady LLP

(57) ABSTRACT

The invention relates to a method for producing a composite component (12). At least one shaft (2) and at least one sintered part (1), preferably in the form of a rotor or a cam, are assembled into the composite component. In order to assemble the composite component, at least the following steps are carried out: —introducing the shaft (2) into a continuous bore (3) of the sintered part (1) and —calibrating the sintered part (1) at least by means of a calibrating die (4), furthermore preferably with the simultaneous application of an axial force onto the sintered part (1) by means of at least one upper punch (5) and at least one lower punch (7), wherein the shaft (2) can be found in the bore (3) of the sintered part (1) at least temporarily during the calibration process. The invention further relates to a composite component (12).

18 Claims, 4 Drawing Sheets

Figure 1:
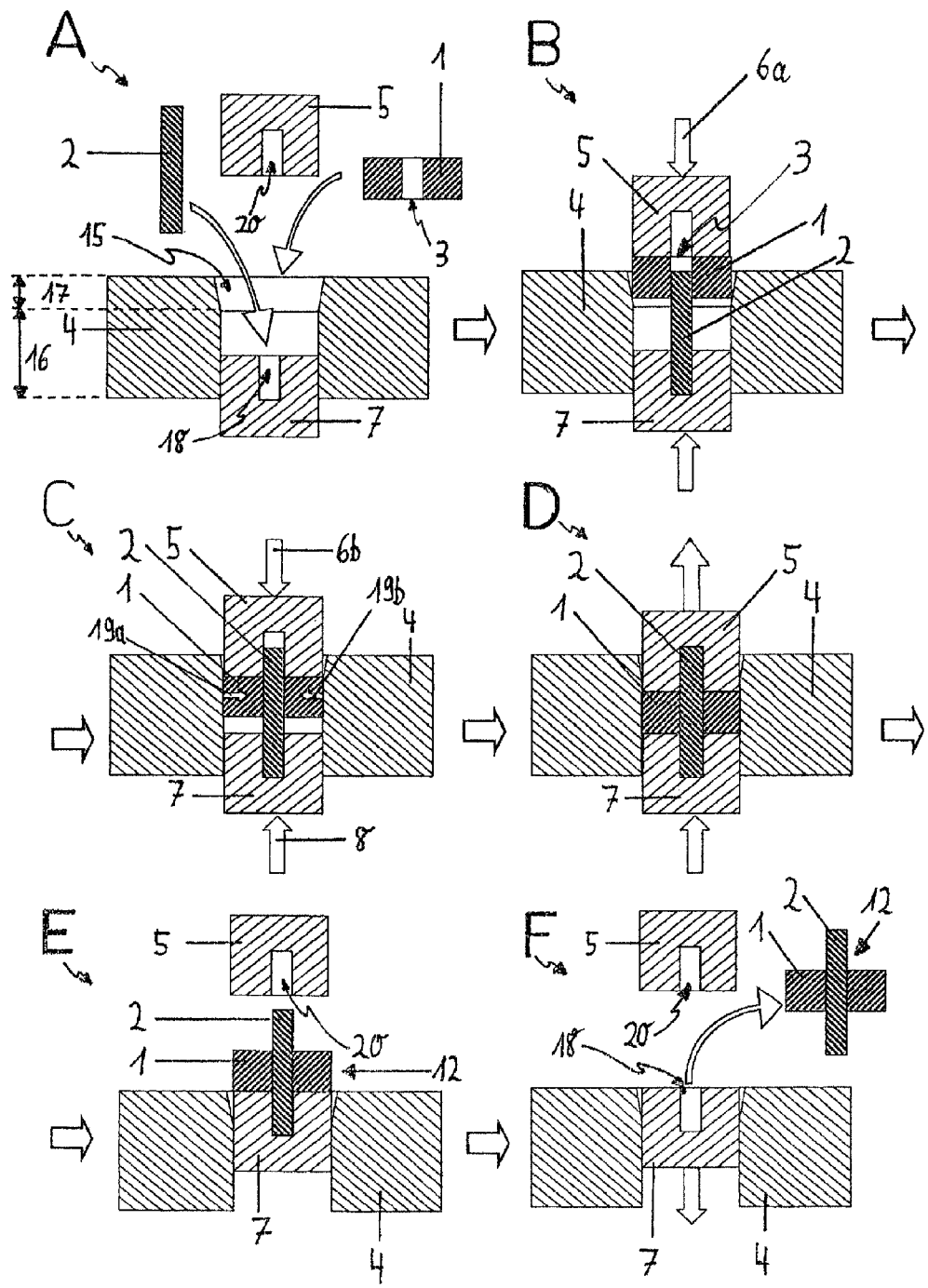

(51) Int. Cl.

| | |
|---|---|
| B22F 3/16 | (2006.01) |
| B22F 7/06 | (2006.01) |
| B23P 11/00 | (2006.01) |
| F01L 1/047 | (2006.01) |
| F16D 1/072 | (2006.01) |
| F16H 53/02 | (2006.01) |
| F01L 1/344 | (2006.01) |
| B22F 5/08 | (2006.01) |
| B22F 3/10 | (2006.01) |
| B22F 7/00 | (2006.01) |
| B22F 7/08 | (2006.01) |
| C21D 1/18 | (2006.01) |
| C21D 1/26 | (2006.01) |
| C21D 9/00 | (2006.01) |
| C22C 9/02 | (2006.01) |
| C22C 9/04 | (2006.01) |
| C22C 21/00 | (2006.01) |
| C22C 38/00 | (2006.01) |
| C22F 1/00 | (2006.01) |
| C22F 1/04 | (2006.01) |
| C22F 1/08 | (2006.01) |
| B22F 3/24 | (2006.01) |

(52) U.S. Cl.
CPC ............... *B22F 3/24* (2013.01); *B22F 5/08* (2013.01); *B22F 7/008* (2013.01); *B22F 7/062* (2013.01); *B22F 7/08* (2013.01); *B23P 11/005* (2013.01); *C21D 1/18* (2013.01); *C21D 1/26* (2013.01); *C21D 9/0068* (2013.01); *C22C 9/02* (2013.01); *C22C 9/04* (2013.01); *C22C 21/00* (2013.01); *C22C 38/00* (2013.01); *C22F 1/002* (2013.01); *C22F 1/04* (2013.01); *C22F 1/08* (2013.01); *F01L 1/047* (2013.01); *F01L 1/3442* (2013.01); *F16D 1/072* (2013.01); *F16H 53/025* (2013.01); *B22F 2003/248* (2013.01); *B23P 2700/02* (2013.01); *F01L 2001/0471* (2013.01); *F01L 2101/00* (2013.01); *F01L 2103/00* (2013.01); *Y10T 29/49925* (2015.01); *Y10T 428/12014* (2015.01)

(56) References Cited

U.S. PATENT DOCUMENTS

| | | |
|---|---|---|
| 2008/0276753 A1 | 11/2008 | Takamura |
| 2008/0301938 A1* | 12/2008 | Bonse .............. B21D 53/845 29/888.1 |
| 2010/0224146 A1 | 9/2010 | Kuwahara et al. |

* cited by examiner

METHOD FOR PRODUCING A COMPOSITE COMPONENT, AND COMPOSITE COMPONENT

CROSS-REFERENCE TO RELATED APPLICATIONS

This application represents the national stage entry of PCT International Application No. PCT/EP2013/002263 filed Jul. 31, 2013, which claims priority of German Patent Application No. 10 2012 017 040.8 filed Aug. 29, 2012, the disclosures of which are incorporated by reference here in their entirety for all purposes.

The invention relates to a method for producing a composite component, and to a composite component.

It is known to join components to one another. According to one joining method, a connection is established by means of a spring. This requires a certain type of mechanical processing, however, for which additional effort is required. In production engineering, joining is classified into various groups, into which different joining processes are ordered. According to one of these groups, components are pressed on or are pressed in. In this case, by means of an appropriate interference of a first component relative to a cavity of a second component, it is possible to establish a press-fit connection between this first component and the second component. A disadvantage of this type of joining by means of a method of pressing components on or in, however, is that many of these methods can only be used to a limited extent with components produced via powder metallurgy. The reason therefor is the inherent porosity of powder metallurgical components, which are at risk of damage from the pressures applied to press said components on or in, wherein said pressures or often enormous. This problem becomes that much more serious, the lower the fracture strain of the components produced via powder metallurgy. From a technological perspective, pressing on and pressing in are used particularly frequently to join rotors to shafts, wherein the above-described problems arise specifically in the case of joining rotors that are produced via powder metallurgy.

The problem addressed by the invention is that of simplifying joining and thereby making it possible to produce higher-quality composite components.

The problem is solved by a method and by a composite component disclosed herein. Other advantageous embodiments and developments will become clear from the description that follows. One or more features of the claims, the description, and the figures can be combined with one or more features thereof to form further embodiments of the invention. In particular, one or more features of the independent claims can be replaced by one or more of the other features from the description and/or the figures. The proposed claims should be interpreted only as a draft of the wording of the subject matter, which does not limit said subject matter, however.

A method for producing a composite component is proposed. According to the method for producing a composite component, at least one shaft and at least one sintered part comprising at least one outer periphery are joined to form the composite component. In order to assemble the composite component, at least the following steps are carried out:

introducing the shaft into a continuous bore of the sintered part, and calibrating the sintered part at least by means of a calibrating die. The shaft is located in the bore of the sintered part at least temporarily during the calibration process.

In this case, the term "composite component" refers, in particular, to components that are composed of at least two components, wherein at least two of the components are detachably or non-detachably interconnected. It may also be provided, however, that more than two components are interconnected. It can be provided, for example, that the composite component is a camshaft, a gear shaft, or a spur gear shaft.

The term "shaft", as used herein and in common language, is a machine element provided for transmitting rotational movements and/or torques and/or for supporting rotating parts. In a simplest form, this can be a cylindrical rod having a circular cross-section, for example. It may also be provided, however, that the term "shaft" also refers to shafts that have a cross-section that is not circular. For example, shafts can be provided that have a rectangular, square, elliptical, triangular, or polygonal cross-section. Shafts can also be provided that have another type of cross-section that does not correspond to a regular geometric figure. The term "shaft" as used herein is also intended to comprise shafts that deviate from the shape of a rod entirely or at least in sections. It can be provided, for example, that shafts having a non-cylindrical cross-sectional area are included in the term "shaft". It is also intended that a shaft can be provided that has a cross-section that changes or that has a shape that changes. In addition, embodiments are intended to be possible in which the existing rotational axis and/or centroid axis, which is designed, e.g., as a geometric centroid of a cross-section of the axis extending through the shaft, is not symmetrical. It is also possible, for example, to provide shafts that are angled once or several times relative to the axial direction and relative to directions parallel to the axial direction, wherein said shafts are often referred to as offset shafts. In addition to regions of the shaft that are angled at right angles, regions can be provided that are angled at angles other than a right angle.

The use of the term "shaft" in the application used herein is also intended to mean that the term "shaft" includes components that are elongated at least in areas and are not provided for transmitting rotational movements and/or torques, but exclusively for supporting and/or carrying rotatable components. It is also provided, for example, that the methods described in the following also include a joining of axles, namely that the term "shaft" in a broader sense also includes axles.

The sintered part is preferably designed as a rotor or a cam.

The term "rotor" as used herein refers to all machine elements and other components that are provided for rotation about the shaft or with the shaft. In this case, the rotation can be rotation about any axis, i.e., a rotational axis of the rotor does not necessarily need to coincide with a rotational axis of the shaft. It may also be provided that a rotational axis of the rotor and/or a rotational axis of the shaft do not coincide with an axis of symmetry of the rotor. The term "rotor" can include, for example, gear wheels, elliptical gears, worm gears, spur gears, and many others, as well as the explicitly claimed cams, in particular.

The term "sintered part" refers to components that are produced by means of primary shaping processes, including powder metallurgical methods, in particular. The term "sintered part" refers to a sintered component or a sintered component that was subsequently treated after sintering, for example by means of an additional heat treatment. The term "heat treatment" in this case refers to at least a targeted heating and/or quenching of the component. The targeted heating can take place in this case, for example, as part of the belt process in a production of a sintered part in a sintering belt furnace process, or it can be provided that a separate heating process is carried out.

The term "outer periphery" is used, in particular, to describe a circumferential surface of the sintered part. The outer periphery can be oriented, e.g., partially or entirely parallel to an axis of the sintered part, or any other type of orientation can be provided, e.g., when the sintered part has a conical shape.

The term "bore" is used to describe a cavity. The term "continuous bore" refers to a cavity through which a component extends, from a first surface to a second surface. The term "bore" does not imply, in this case, that the cavity absolutely must have been produced by means of boring. Since the described method is intended, in particular, for joining components produced by means of primary shaping processes and, in particular, by means of powder metallurgical processes, especially such as a sintering process, the bore is formed in many cases directly during this primary shaping process. In addition to a formation of the bore by means of a primary shaping process, it is also possible to provide additional methods for forming a bore. The term "bore" also does not imply that a specific cross-sectional area must be present. In particular, contrary to the frequently common, colloquial use of the term, it is not necessary for the bore to be a continuous cavity having a circular cross-sectional area. Instead, it may also be provided that the bore has, e.g., square, rectangular, polygonal, or irregular cross-sectional areas. In addition to a cylindrical embodiment of the bore, it is also possible to provide a course of the bore that deviates from a cylindrical configuration. For example, it can be provided that the bore has different cross-sectional shapes at different positions of the axis. It may also be provided that the bore has a course, e.g., in sections, that is conical or that otherwise changes an extent of the cross-sectional area.

The concept of introducing the shaft into a continuous bore of the sintered part is intended to mean, in this case, that the shaft can be introduced into the bore by moving only the shaft, moving only the sintered part, or simultaneously and/or alternately moving the shaft and the sintered part.

In one embodiment, it is provided that an introduction of the shaft into the continuous bore is complete. An introduction is considered to be complete when the continuous bore is completely filled by the shaft.

It may also be provided that the shaft is only partially introduced into the continuous bore.

Both possibilities, namely a partial or a complete introduction of the shaft into the bore, are intended to be included in the concept of introducing the shaft into the bore.

According to a preferred embodiment of the method, calibration is carried out with the simultaneous application of axial pressure onto the sintered part by means of at least one upper punch and at least one lower punch.

In one embodiment of the method it can be provided, for example, that the shaft is at least partially positioned in the calibrating die,
   the shaft is then introduced into the continuous bore by
      guiding the sintered part into the calibrating die with the shaft positioned in the calibrating die,
   at least partially during and/or partially after the introduction of the shaft into the continuous bore, the sintered part is calibrated in the calibrating die and is thereby joined with the shaft to form the composite component.

The shaft is partially positioned in the calibrating die preferably by radially positioning the shaft by arranging the shaft on a lower punch.

The concept of radial positioning includes, in this case, positioning the shaft in a direction that is perpendicular to the axial direction. As a result, the shaft can be introduced into the continuous bore of the sintered part such that the sintered part, with the shaft in the bore thereof, can be slid over the shaft. While the sintered part is being guided into a region of the shaft, the sintered part can be guided into the calibrating die. Guiding the sintered part into the calibrating die includes, in this case, that at least one axial region of the sintered part is located in an axial region of the calibrating die. While the sintered part is being guided into the calibrating die, the sintered part preferably initially enters a region of a lead-in bevel of the calibrating die.

Preferably, an introduction of the shaft into the continuous bore of the sintered part is carried out at least partially within the region of the lead-in bevel.

In another embodiment of the method, the introduction of the shaft into the continuous bore takes place outside of the calibrating die. Subsequent thereto, the sintered part, with the shaft located in the bore, is positioned in the calibrating die. The sintered part is calibrated in the calibrating die at least partially during and/or partially after the introduction of the shaft into the continuous bore and is thereby joined with the shaft to form the composite component.

It may also be provided that the sintered part is positioned at least partially in the calibrating die and the shaft is then introduced into the continuous bore. It may also be provided that the sintered part is calibrated in the calibrating die at least partially during and/or partially after the introduction of the shaft into the continuous bore and is thereby joined with the shaft to form the composite component.

According to a preferred embodiment, the sintered part is placed into the calibrating die at least partially in a region of a lead-in bevel.

According to one embodiment, the sintered part can be calibrated before the shaft is introduced into the bore. It can be provided that the sintered part is calibrated up to a state of said sintered part in which said sintered part has not yet reached the final dimensions thereof.

According to another embodiment of the method, the shaft is not oversized relative to the bore before the shaft is introduced into the bore.

An advantage of an embodiment of the method in which the shaft is not oversized relative to the bore before said shaft is introduced into the bore is, for example, that the shaft can be easily introduced into the bore. For example, in a case in which the shaft is already positioned in a lower punch in a region of the calibrating die, the shaft can be positioned without an additional application of force or with an application of only a small amount of force in a region of the calibrating die, such as a region of the lead-in bevel, in particular. Given that no pressing is required for the initial introduction of the shaft into the die, the advantage results, for example, that joining is markedly simplified. In addition, the advantage results that a risk of damage to one of the components such as, in particular, damage to the sintered part due to internal tensile stresses, is markedly reduced and/or that the cost-effectiveness of the method is improved, since pressing is no longer required.

As another advantage, due to the possibility of introducing the shaft into the continuous bore before pressing, the advantage results that the shaft functions as a guide for the sintered part for a subsequent pressing process.

In another embodiment of the method, it can be provided that the shaft has a cylindrical design, at least in areas, with a cross-section that matches the shape and dimensions of the cross-section of the bore.

A decisive factor for an embodiment of the method comprising a shaft having a cylindrical design, at least in areas, with a cross-section that matches the shape and dimension of the cross-section of the bore is the point in time at which the shaft is introduced. It can be provided, for example, that the bore has greater dimensions than the shaft before an initial calibration of the sintered part. It can be provided, for example, that the shaft is introduced into the bore after an initial calibration of the sintered part and that a second calibration is carried out after the introduction.

In one embodiment, it can be provided, in particular, that the shaft is cylindrical, at least in areas, and has a diameter, at least in areas, that is the same as the diameter of the cross-section of the shaft in the region that is circular, at least in areas.

In another development, it can be provided, for example, that the shaft is circular-cylindrical and that the diameter of the shaft is smaller than the diameter of the bore.

According to another embodiment of the method, after the shaft is introduced into the bore of the sintered part, the sintered part is pressed, with the shaft located in the bore, into the calibrating die.

In this case it can be provided that the shaft is introduced into the bore entirely outside of the calibrating die. It may also be provided that the shaft is introduced into the bore of the sintered part in a region of a lead-in bevel of the calibrating die, and therefore that the pressing-in starts with a sintered part already located in a region of the calibrating die.

By introducing the sintered part into the calibrating die—with the shaft located in the bore of the sintered part—by means of pressing, a radial pressure, which is applied by the calibrating die onto the outer periphery of the sintered part for calibration during a time period of the pressing, causes the shaft to apply a counterforce onto the sintered part at the contact surface of an inner surface of the bore and the outer circumference of the shaft. The shaft therefore functions as a sizing mandrel. It is therefore provided that the shaft is used as a sizing mandrel at least during a time period of the calibration of the sintered part.

According to another embodiment of the method, the sintered part is pressed axially into the calibrating die.

According to another embodiment of the method, for example, the sintered part is pressed axially when pressure acts on a top side of the sintered part and/or on an underside of the sintered part at least partially during calibration and in addition to the concentric pressure applied by the calibrating die.

It can be provided, for example, that exactly one lower punch applies pressure onto a first axial end face of the sintered part by means of pressing and exactly one upper punch applies pressure onto a second axial end face of the sintered part, which is oriented parallel to the first axial end face, by means of pressing, while radial pressure is simultaneously applied by the calibrating die onto the sintered part. In this case, the sintered part and/or the shaft are therefore completely enclosed by the calibrating die and the upper punch and the lower punch such that a polydirectional, external pressure is applied onto all or largely all external surfaces. This largely prevents a release of internal tensile stresses in the sintered part.

In another embodiment of the method, it can be provided, for example, that by calibrating the sintered part with the shaft located in the bore of the sintered part at least temporarily during the calibration, it is possible, in one and the same working step to
  establish a non-positive connection between the sintered part and the shaft, and
  calibrate the outer periphery of the sintered part by means of radial compression.

A contribution to a non-positive connection between the sintered part and the shaft can be achieved, for example, in that internal compressive stresses are substantially produced in the sintered part and these internal compressive stresses are high in order to establish a non-positive connection between the shaft and the sintered part.

In another embodiment of the method it can be provided, for example, that internal compressive stresses are substantially generated within the sintered part by means of pressure generated by the calibration of the sintered part, which acts on the sintered part, in interaction with counter pressure generated by the shaft, which is located in the bore of the sintered part.

In this embodiment of the method, it is preferably provided that a non-positive connection is established between the sintered part and the shaft substantially by means of these internal compressive stresses.

In this case, the internal compressive stresses are generated, in particular, by the pressure applied onto one, several or, preferably, all external surfaces during the calibration and, optionally, with the simultaneous or temporarily simultaneous axial pressing in interaction with the pressure applied onto the inner surface of the bore by means of the shaft, which is located in the bore of the sintered part at least temporarily during the calibration. The application of pressure on several sides or, preferably, on all sides results in the advantage that internal compressive stresses form within the sintered part nearly completely, i.e., to a preponderant extent. Internal tensile stresses that may cause cracks to form in the sintered part are largely avoided, however, and/or are overcompensated for by the internal compressive stresses. This results in the advantage that sintered parts made of materials having a relatively low fracture strain can also be joined with a shaft by means of the method described.

According to another embodiment of the method, for example, a circumferential surface of the shaft has at least one knurl and/or a contour that are oversized relative to the circumferential surface of the shaft and/or an inner surface of the bore has at least one knurl and/or contour that are oversized relative to the inner surface of the bore. It is furthermore provided that the knurl and/or contour induces a radial compression of the material of the sintered part.

In this case, an oversized knurl refers to a wall-type raised area, which is applied on the circumferential surface of the shaft and/or the inner surface of the bore. This can be a linear raised area that extends in an axial direction or in another direction. This can also be a raised area that follows any course. It can be provided, for example, that the knurl follows a zigzagged course or a wavy course.

It may also be provided, for example, that the knurl is formed in the sintered part and/or the shaft by means of the primary shaping process. It may also be provided that the knurl is not applied until the sintered part and/or the shaft are produced. It may also be provided that the knurl is applied on the sintered part after sintering, after an optionally implemented heat treatment, or at any other time. It may also be provided that the knurl is applied on the shaft after casting, after forging, and/or after another processing step to produce the shaft. Likewise, it can be provided that the knurl is applied on the shaft by removing material from a shaft that is already oversized relative to the bore in the sintered part intended to be joined with the shaft only in the regions of the surface of the shaft in which a knurl is not provided, such that the knurl remains only in the other regions.

A contour that is oversized relative to the circumferential surfaces of the shaft or is oversized relative to the surface of the bore refers to a raised area that is not wall-like, but rather has a different design. For example, this can refer to hill-type raised areas or similar raised areas. The raised areas can be designed, in this case, having a regular geometric shape, e.g., cylindrical or shaped as pyramids, and having a regular or irregular arrangement.

It can be provided, in particular, that the material of the sintered part is compressed when the shaft is introduced into the bore and/or during calibration. Material of the sintered part is compressed when the shaft is introduced into the bore in a region of the knurl and/or the contour, in particular. Due to the oversize of the knurl and/or the oversize of the contour, a form-fit connection is produced, e.g., by means of plastic deformation processes in the region of the knurl and/or contour, during the introduction of the shaft into the bore and/or during the calibration. The advantage of a form-fit connection is that this acts in addition to a non-positive connection, thereby improving the connection between the sintered part and the shaft such that, for example, the sintered part can withstand higher torques.

According to another embodiment of the method, a circumferential surface of the shaft comprises at least one knurl and/or contour that are oversized relative to the circumferential surface of the shaft and/or an inner surface of the bore comprises at least one knurl and/or contour that are undersized relative to the inner surface of the bore, and that the knurl and/or the contour is filled with material of the sintered part and thereby brings about a form-fit connection.

Likewise, it can be provided that a knurl and/or contour that are undersized relative to the circumferential surface of the shaft are disposed on the circumferential surface of the shaft. As a result, material of the sintered part is introduced into the knurl and/or contour by means of plastic deformation processes under the action of external pressure, in particular during calibration. As a result, a form-fit connection is established such that the connection between the sintered part and the shaft is improved.

Likewise, it can be provided that a knurl and/or contour that are undersized relative to the inner surface of the bore are disposed on the inner surface of the bore.

According to another embodiment of the method, the sintered part is made at least partially of a curable alloy. In this embodiment of the method, it is also provided that, after the sintered part has been produced, in particular via sintering, calibration is carried out before the sintered part is cured.

An advantage of an application of the method having a curable alloy or a plurality of curable alloys is that the sintered part has high strength. In many cases, in particular, an advantage of curable alloys is that a satisfactory strength and/or hardness is associated with relatively high ductility, which is often advantageous in the case of components used as rotors, for example, since this combination of properties is also often associated with relatively high cycling strength and/or fatigue strength.

Another advantage of an application of a sintered part made of a curable alloy is that joining can be carried out in a state in which the material of the sintered part has not yet cured and is therefore markedly softer than in the cured state. Alloys can be used, for example, which make it possible to increase strength by means of the removal of particles as the result of a suitable heat treatment. In this case, binary or pseudobinary alloys can be provided for use here, in particular, which have a limited formation of mixed crystals of the two components with the formation of intermetallic phases, and which have a region, in the phase diagram thereof, within which the solubility of the dissolved components decreases as the temperature decreases. Classic examples of such alloys are, for example, aluminum alloys, bronze alloys, brass alloys, and copper alloys.

It may also be provided that the sintered part comprises a heterogeneous microstructure made of two or more alloys. The sintered part can also comprise alloys other than binary or pseudobinary alloys, for example ternary or quaternary alloys, or alloys having even more components. It is also possible to provide alloys that have additives.

It may also be provided that the sintered part comprises cast alloys exclusively or in addition to curable alloys. The sintered part can also contain other alloys or pure metals.

According to another embodiment of the invention, it can be provided that solution annealing and/or quenching of at least the sintered part is carried out after the sintered part is produced, in particular by sintering. In this embodiment of the method it is also provided that the sintered part is calibrated before the sintered part is cured.

Such a method can be carried out, for example, when the sintered part comprises a curable alloy. In this case, it can be provided, for example, that solution annealing is carried out after the sintered part is sintered. This solution annealing results in a mixed-crystal formation of a phase at room temperature that is not predicted by the corresponding equilibrium phase diagram. In addition, it can be provided that the solution annealing is followed by a quenching, i.e., rapid cooling, of the sintered part. The quenching can be carried out, for example, by dipping the sintered part in water, oil, or liquid plastic. The quenching prevents the sintered part from assuming the equilibrium phase thereof and, instead, the phase or phases that comprise mixed crystals and are largely assumed during the solution annealing, remain metastable. After a certain period of time, the curable alloy is cured.

The curing of the curable alloy can be carried out in this case at room temperature or at temperatures higher than room temperature, wherein, below a maximum temperature, above which curing is no longer possible, the lower the temperatures, the longer the time period required for curing. This curing process is known as precipitation treatment.

It may also be provided, for example, that calibration takes place at a temperature that is suitable for curing the sintered part, such as the so-called precipitation treatment temperature. To this end, it can be provided that the calibrating die is heated.

It may also be provided that calibration takes place at room temperature. Likewise, it can be provided that the calibrating die is cooled.

It may also be provided that, instead of solution annealing or in addition to subsequent solution annealing, quenching can be carried out directly after sintering, since the sintered part has a high temperature after sintering. In cases in which the temperature of the sintered part after sintering corresponds to a temperature that is suitable for the solution annealing, quenching can be carried out instead of the solution annealing immediately after sintering and, optionally, after the waiting period after sintering that is required to cool the sintered part to the temperature that is suitable for the solution annealing.

Calibration can be carried out after quenching and before the sintered part is cured.

In another embodiment of the method, it can be provided, for example, that the sintered part and/or the shaft are comprised, at least in part, of an aluminum alloy, a bronze alloy, a brass alloy, and/or a steel.

For example, it can be provided that the sintered part comprises a self-hardening Al alloy of the type AlMn, AlMg, and/or of the type AlMgMn. In addition, it can be provided that the sintered part comprises a curable alloy of the type AlCuMg, AlCuSiMn, AlMgSi, AlZnMg, and/or of the type AlZnMgCu. It may also be provided, for example, that the sintered part comprises an Al cast alloy of the type AlSi, AlSiMg, AlSiCu, AlMg, AlMgSi, AlCuTi, and/or of the type AlCuTiMg.

In particular it can be provided that the sintered part comprises the material Al-4.4Cu-0.7Si-0.5Mg.

In particular it can be provided that the sintered part comprises the material Al-14Si-2.5Cu-0.5Mg.

In particular it can be provided that the sintered part comprises the material Al-5.5Zn-2.5Mg-1.5Cu.

In particular, it can be provided that the sintered part comprises the material Al-x Cu-y Mg-z ceramic, i.e., so-called Al-MMC. In this case, x, y and z are percentages, wherein x>y>z.

In addition, it can be provided that the sintered part comprises a Cu alloy, such as a bronze or brass alloy, in particular.

Likewise, it can be provided that the shaft comprises one or more of these aforementioned materials.

A substantial advantage of the described method is that the method can be used to enable a connection to be established between the sintered part, which is designed as a rotor, and a shaft, even in cases in which the fracture strain of the sintered part designed as a rotor is relatively low.

Another substantial advantage of the described method is that the method can be used, in principle, to enable sintered parts designed as rotors to be joined with shafts for basically any combinations of materials of the sintered part and the shaft.

In another embodiment of the method, the sintered part and the shaft comprise an identical material. According to another embodiment of the method, the sintered part and the shaft are substantially formed of the same material. According to another embodiment of the method, the same material is used to produce the sintered part and to produce the shaft.

According to another embodiment of the method, it is provided, for example, that the sintered part and the shaft have the same coefficients of volume expansion of the volume expansion per degree at room temperature and/or at the sintering temperature and/or at half the sintering temperature expressed in Kelvin. According to another embodiment, the sintered part at room temperature and/or at the sintering temperature and/or at half the sintering temperature expressed in Kelvin has a lower volume expansion per degree Kelvin than the shaft.

A substantial advantage of the described method is that, due to the calibration of the sintered part with the shaft located at least temporarily in the bore of the sintered part, which largely prevents the generation of internal tensile stresses, it is possible to join components that are made of materials having comparable and/or identical coefficients of thermal expansion. Due to the described method, the aforementioned also applies in cases in which a press-fit connection can no longer be established, by means of conventional methods of joining in a heated state with subsequent quenching, due to differences in the coefficients of thermal expansion that are too great, simultaneously coupled with a fracture strain of a second component comprising a first component that is too low.

In particular, it is possible, for example, to realize a combination of an engine made of an aluminum alloy with a shaft made of an aluminum alloy.

Another idea of the invention, which can be applied either depending on or independently of the above-described method, relates to a composite component.

The composite component comprises a sintered part having a bore. A shaft is introduced into the bore. The sintered part is thereby connected to the shaft at least in a non-positive manner as well. It is preferable for the sintered part to be thereby connected to the shaft substantially in a non-positive manner, for internal compressive stresses to predominate over internal tensile stresses in the sintered part, and for these internal compressive stresses to make a substantial contribution to the non-positive connection between the sintered part and the shaft.

In an embodiment of the composite component, it is provided that the sintered part and/or the shaft are comprised, at least in part, of an aluminum alloy, a bronze alloy, a brass alloy, and/or a steel.

In another embodiment of the composite component, it can be provided, for example, that the sintered part is a rotor or a cam.

According to another idea of the invention, one of the above-described methods is used to join at least one sintered part to a shaft to form a composite component. In this case, the sintered part is preferably a rotor or a cam.

Other advantageous embodiments and developments will become clear from the following figures. The details and features shown in the figure are not limited thereto, however. Instead, one or more features can be combined with one or more features mentioned in the description, above, to form new embodiments. In particular, the explanations that follow are not intended to limit the respective scope of protection, but rather to explain individual features and their possible interaction with one another.

Figure 2:
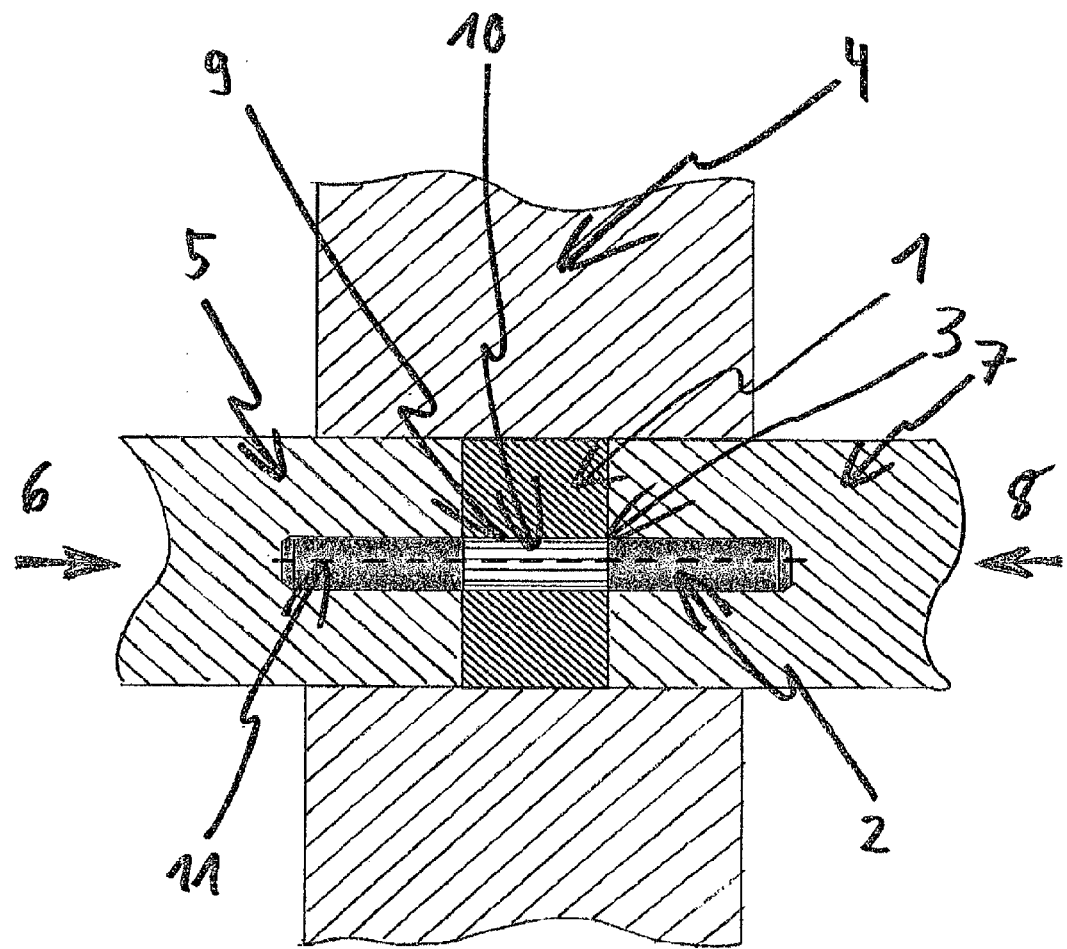
Figure 3:
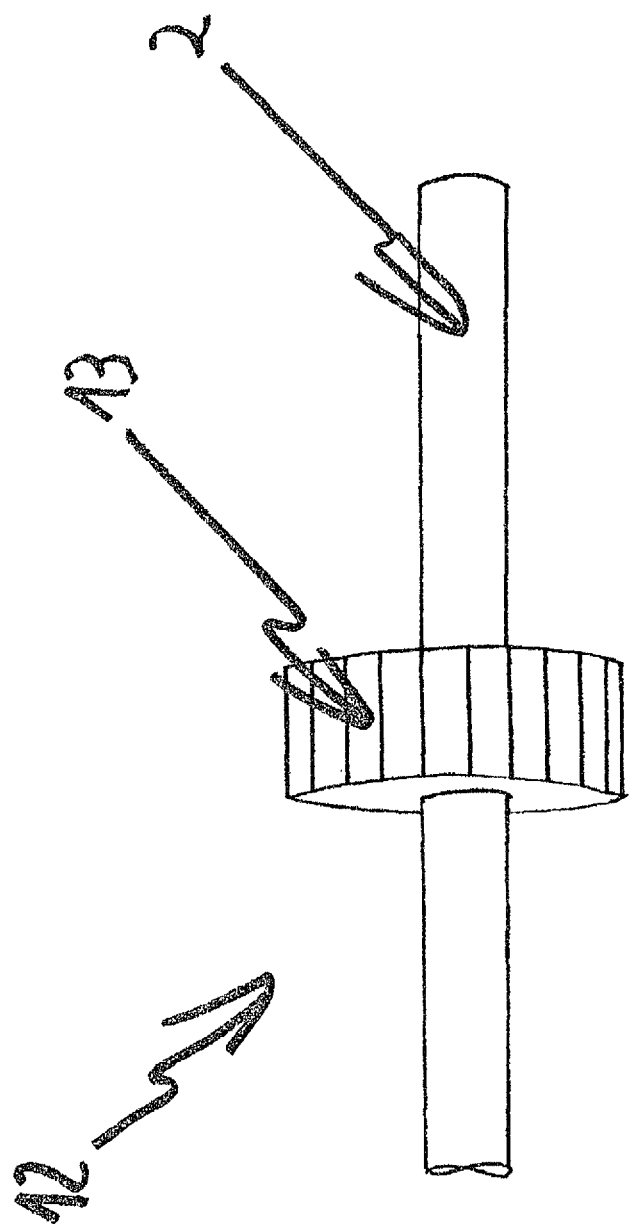
Figure 4:
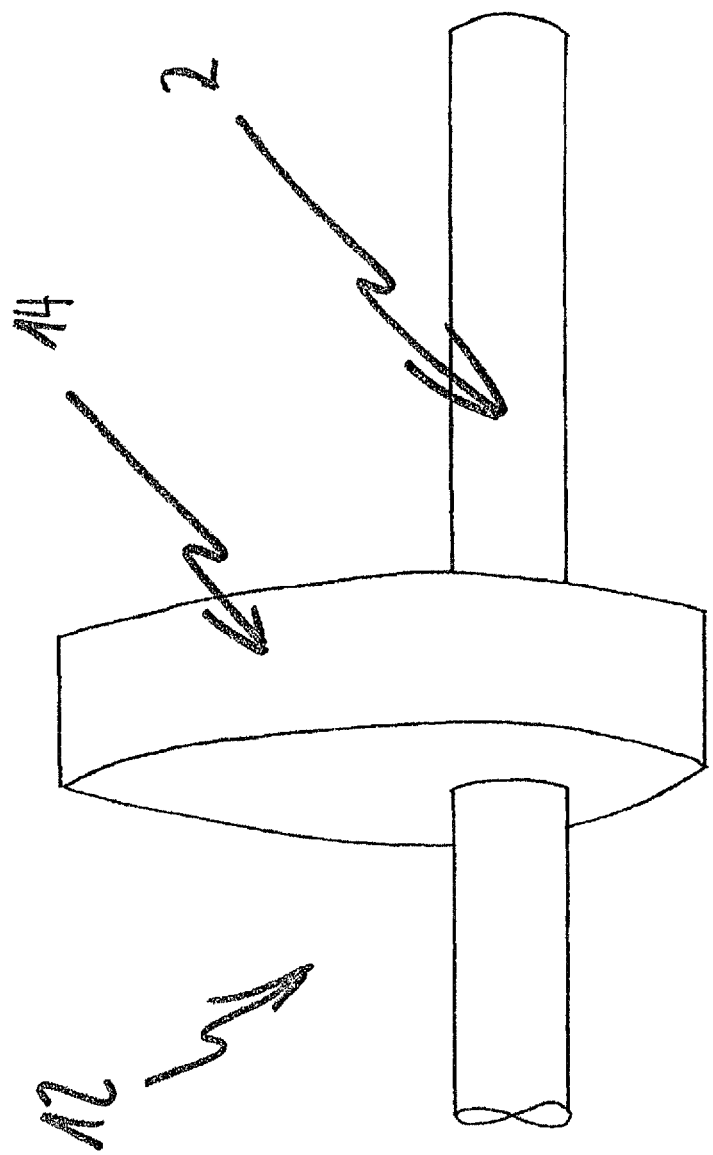

Therein:

FIG. 1 shows a flow diagram of an exemplary embodiment of a method for producing a composite component, FIG. 2 shows an intermediate step of another exemplary embodiment of a method for producing a composite component, FIG. 3 shows an exemplary embodiment of a composite component, and FIG. 4 shows another exemplary embodiment of a composite component.

FIG. 1 shows an embodiment of a method for producing a composite component 12, as an example of how said method can be carried out. Subfigure A shows a cross-section of a calibrating die 4. The calibrating die 4 has a cavity 15, the radial dimensions of which, in a lower region 16 thereof, correspond to the final intended outer dimensions up to the outer circumference of the sintered part 1. In an upper region 17 of the cavity 15, the calibrating die has a lead-in bevel. A lower punch 7 is located in a lower region of the cavity 15 and has a receiving cavity 18 designed as a circular-cylindrical cavity in the embodiment shown. The circular-cylindrical cavity has the same diameter as the shaft 2 and is therefore suitable for receiving the shaft for the radial positioning thereof. The lead-in bevel, which is located in the axial region 17 of the calibrating die 4, is characterized in that said lead-in bevel tapers concentrically to the dimensions of the cavity 15 of the calibrating die 4 in the region 16 having the final outer circumference of the sintered part 1 and thereby proceeds from an opening in a surface of the calibrating die 4, the dimensions of which are greater than the intended final dimensions of the sintered part 1. In a first step, the shaft 2 is introduced into the circular-cylindrical cavity 18. In a second step, the sintered part 1 comprising the shaft 2 in the bore 3 thereof is positioned in the calibrating die 4. The shaft 2 is therefore introduced into the continuous bore 3 of the sintered part 1. The sintered part 1 is positioned such that said sintered part is inserted into an axial region 17, which is the region of the lead-in bevel.

As shown in subfigure B, the sintered part 1 is inserted into the lead-in bevel of the calibrating die 4 and the shaft 2 is hereby partially introduced into the bore 3 of the sintered part 1. The lead-in bevel is designed to accommodate the sintered part 1 such that the diameter of said lead-in bevel on the side thereof located in a region of the surface is greater than the dimensions of the sintered part 1. In a region 16 underneath the lead-in bevel, the radial expansions of the cavity 15 of the calibrating die 4 are less than the radial expansion of the sintered part 1 before calibration. Finally, the sintered part 1 is axially pressed into the calibrating die 4. Axial pressure, as indicated by the arrow 6a, which acts on a top side of the sintered part, is generated by means of an upper punch 5 in order to press the sintered part 1 into the calibrating die 4.

As shown in subfigure C, the sintered part 1 is pressed into the calibrating die 4 by the application of axial pressure onto a top side of the sintered part 1. Due to the fact that the expansion of the cavity 15 of the calibrating die 4 diminishes in the pressing-in direction of the lead-in bevel as the pressing-in continues along the axis of the shaft 2, radial pressure is generated from the outer circumference of the sintered part into the interior of the sintered part, i.e., in the direction of the shaft. The radial pressure is indicated by arrows 19a and 19b. The upper die 5 also has a cylindrical cavity 20 in this case, the cross-section of which is identical to that of the shaft 2. The shaft 2 can therefore be accommodated by the cylindrical cavity 20, which takes place when the sintered part 1 is pressed in by means of the upper punch 5.

As shown in subfigure D, the polydirectional pressure that is applied acts in the axial direction on a top side and an underside, in the direction of the interior of the sintered part in each case, as indicated by the arrows 6b and 8 shown in subfigure C, and the pressure applied onto the outer circumference of the sintered part 1 into the interior of the sintered part 1 as indicated by the arrows 19a and 19b shown in subfigure C both cause the outer circumference of the calibrating die 4 to assume the dimensions given by an inner surface of the recess 15 of the calibrating die 4 in the region 16, i.e., the objective of calibration has been achieved.

As shown in subfigure E, after calibration, the sintered part 1 is ejected with the shaft 2, which is joined with the sintered part 1, as a composite component 12.

Finally, subfigure F shows that the sintered part 1 is removed from the calibrating die 4, as the final step. The sintered part 1 and the shaft 2 are now a composite component.

According to a special embodiment of the method, it is provided, for example, that, for a sintered part comprising an aluminum alloy Al-4.4Cu-0.7Si-0.5Mg, an alloy Al-14Si-2.5Cu-0.5Mg, an alloy Al-5.5Zn-2.5Mg-1.5Cu or an alloy Al-x Cu-y Mg-z ceramic, sintering is carried out at a temperature in a temperature range between 550° C. and 620° C. The sintering is preferably carried out for a period of approximately 30 min-60 min. In this special embodiment, calibration is preferably carried out over a period of 10 hours, preferably over a period of 5 hours, before the sintered part has largely cured after approximately 10 hours at room temperature.

If calibration has not occurred within this period of time, it is provided, for example, that, before calibration is performed, solution annealing is carried out at 500° C., quenching in water is carried out, and calibration is carried out for the time period described in the previous section.

FIG. 2 shows a sub-step of a method, which is similar to the method shown in FIG. 1 as an example. The method step shown approximately corresponds to the method step indicated in subfigure D shown in FIG. 1. In contrast to the depiction shown in FIG. 1, subfigure D, it is clear from FIG. 2 that the shaft 2 has an oversized knurl 10. The knurl 10 is applied on the circumferential surface 9 of the shaft 2. The knurl 10 is applied in a region of the shaft 2 that is located within the bore 3 of the sintered part 1 during the joining of the shaft 2 with the sintered part 1. As a result, the material of the sintered part 1 is compressed in the region of the individual lines of the knurl 10 during the calibration, which is carried out with the shaft 2 temporarily located in the bore 3 of the sintered part 1.

FIG. 3 shows an embodiment of the composite component 12, wherein the composite component 12 is designed as a gear wheel in the embodiment shown. The gear wheel is disposed on a rod-shaped shaft 2.

FIG. 4 shows an embodiment of the composite component 12 that is similar to the embodiment shown in FIG. 3. In contrast to the embodiment shown in FIG. 3, it is clear from the embodiment of the composite component 12 shown in FIG. 4 that the sintered part 1 is designed as a cam.

The invention claimed is:

1. A method for producing a composite component, wherein at least one shaft and at least one sintered part having at least one outer periphery, are joined to form the composite component, and wherein the assembly of the composite component comprises at least the following steps of:
   introducing the shaft into a continuous bore of the sintered part,
   calibrating the sintered part at least by using a calibrating die wherein the shaft is located in the bore of the sintered part at least temporarily during the calibration process.

2. The method according to claim 1, wherein
   the shaft is partially positioned in the calibrating die,
   then introducing the shaft into the continuous bore by guiding the sintered part into the calibrating die with the shaft positioned in the calibrating die,
   at least partially during and/or partially after the introduction of the shaft into the continuous bore, the sintered part is calibrated in the calibrating die and is thereby joined with the shaft to form the composite component.

3. The method according to claim 2, wherein partially positioning of the shaft in the calibrating die involves a radially positioning of the shaft by arranging the shaft on a lower punch.

4. The method according to claim 1, wherein
   the shaft is introduced into the continuous bore outside of the calibrating die, the sintered part, with the shaft located in the bore thereof, is positioned in the calibrating die, and, at least partially during and/or partially after the introduction of the shaft into the continuous bore, the sintered part is calibrated in the calibrating die and is thereby joined with the shaft to form the composite component, or the sintered part is positioned in the calibrating die at least partially, preferably in a region of the lead-in bevel, after which the shaft is introduced into the continuous bore, and, at least partially during and/or partially after the introduction of the shaft into the continuous bore, the sintered part is calibrated in the calibrating die and is thereby joined with the shaft to form the composite component.

5. The method according to claim 1, wherein the shaft is not oversized relative to the bore before the shaft is introduced into the bore.

6. The method according to claim 1, wherein, after the shaft is introduced into the bore of the sintered part, the sintered part—with the shaft located in the bore—is pressed into the calibrating die.

7. The method according to claim 1, wherein the sintered part is axially pressed into the calibrating die.

8. The method according to claim 1, wherein the sintered part is pressed axially when pressure acts on a top side of the sintered part and/or on an underside of the sintered part at least partially during calibration and in addition to the concentric pressure applied by the calibrating die.

9. The method according to claim 1, wherein, by calibrating the sintered part with the shaft located in the bore of the sintered part at least temporarily during the calibration, it is possible, in one and the same working step to establish a non-positive connection between the sintered part and the shaft, and calibrate the outer periphery of the sintered part by radial compression.

10. The method according to claim 1, wherein internal compressive stresses are substantially generated within the sintered part by the pressure generated by the calibration of the sintered part, which acts on the sintered part, in interaction with counter pressure generated by the shaft, which is located in the bore of the sintered part.

11. The method of according to claim 10, wherein a non-positive connection is established between the sintered part and the shaft substantially by the internal compressive stresses.

12. The method according to claim 1, wherein a circumferential surface of the shaft has at least one knurl and/or a contour that are oversized relative to the circumferential surface of the shaft and/or an inner surface of the bore has at least one knurl and/or contour that are oversized relative to the inner surface of the bore, and that the knurl and/or the contour induce a radial compression of material of the sintered part.

13. The method according to claim 1, wherein a circumferential surface of the shaft has at least one knurl and/or a contour that are undersized relative to the circumferential surface of the shaft and/or an inner surface of the bore has at least one knurl and/or contour that are undersized relative to the inner surface of the bore, and that the knurl and/or the contour are filled with material of the sintered part and hereby establish a form-fit connection.

14. The method according to claim 1, wherein the sintered part is comprised, at least in part, of a curable alloy and that, after production of the sintered part, calibration is carried out before the sintered part is cured.

15. The method according to claim 1, wherein after production of the sintered part, solution annealing and/or quenching at least of the sintered part is carried out and that the sintered part is calibrated before the sintered part is cured.

16. The method according to claim 1, wherein the sintered part and/or the shaft are comprised, at least in part, of an aluminum alloy, a bronze alloy, a brass alloy, and/or a steel.

17. The method according to claim 1, wherein the sintered part is in the form of a rotor or a cam.

18. The method according to claim 1, wherein calibrating the sintered part at least by using a calibrating die includes with a simultaneous application of axial pressure onto the sintered part by at least one upper punch and at least one lower punch.

* * * * *